(12) United States Patent
Lee et al.

(10) Patent No.: US 9,276,850 B2
(45) Date of Patent: Mar. 1, 2016

(54) PACKET PROCESSING DEVICE FOR IP-BASED INFORMATION-CENTRIC NETWORK

(71) Applicant: Electronics and Telecommunications Research Institute, Daejeon (KR)

(72) Inventors: Byung-Joon Lee, Daejeon (KR); Hong-Seok Jeon, Daejeon (KR); Seung-Hyun Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 176 days.

(21) Appl. No.: 13/944,733

(22) Filed: Jul. 17, 2013

(65) Prior Publication Data
US 2014/0023072 A1   Jan. 23, 2014

(30) Foreign Application Priority Data

Jul. 18, 2012   (KR) ......................... 10-2012-0078441
Mar. 27, 2013  (KR) ......................... 10-2013-0032993

(51) Int. Cl.
*H04J 3/08* (2006.01)
*H04L 12/747* (2013.01)

(52) U.S. Cl.
CPC .................................... *H04L 45/742* (2013.01)

(58) Field of Classification Search
None
See application file for complete search history.

(56) References Cited

U.S. PATENT DOCUMENTS

| 2007/0192321 | A1* | 8/2007 | Farr et al. ......................... 707/9 |
| 2009/0287835 | A1* | 11/2009 | Jacobson ....................... 709/229 |
| 2010/0195653 | A1* | 8/2010 | Jacobson et al. ............... 370/392 |
| 2011/0286459 | A1* | 11/2011 | Rembarz et al. ............... 370/392 |
| 2012/0311073 | A1* | 12/2012 | Varvello et al. ................ 709/217 |
| 2013/0282920 | A1* | 10/2013 | Zhang et al. ................... 709/238 |
| 2014/0173034 | A1* | 6/2014 | Liu et al. ....................... 709/217 |

OTHER PUBLICATIONS

Van Jacobson et al., "Networking Named Content", CoNEXT '09, Dec. 1-4, 2009, pp. 1-12.

* cited by examiner

*Primary Examiner* — Kwang B Yao
*Assistant Examiner* — Juvena Loo

(57) ABSTRACT

Provided is a packet processing device for an information-centric network. The packet processing device includes a packet transceiver configured to transmit and receive packets, and a packet processing unit configured to process a transmitted or received packet including a forwarding identifier that identifies information present in the ICN and corresponds to an IP address of a network node holding the information, and at least one sub-identifier that identifies child information of the information, in which the forwarding identifier is used to forward packets.

15 Claims, 13 Drawing Sheets

PACKET PROCESSING DEVICE FOR IP-BASED INFORMATION-CENTRIC NETWORK

CROSS-REFERENCE TO RELATED APPLICATION

This application claims the benefit under 35 U.S.C. §119 (a) of Korean Patent Application Nos. 10-2012-0078441 filed on Jul. 18, 2012 and 10-2013-0032993, filed on Mar. 27, 2013, the entire disclosure of which is incorporated herein by reference for all purposes.

BACKGROUND

1. Field

The following description relates to information-centric networking, and more particularly, to IP-based information-centric networking.

2. Description of the Related Art

Information-centric networking (ICN) is a communication method using an identifier of information to be obtained other than an address of a communication target host. When the information-centric networking method is used, a client provides the identifier of information to be obtained instead of obtaining information by connecting to the host which holds information. Then, the network finds information using a corresponding identifier and returns the information to the client. A variety of information-centric networking methods, for example, a data-oriented network architecture (DONA), a content-centric network (CCN), and publish-subscribe internet technology (PURSUIT), are available. However, there is no method of realizing high scalability without any changes to an existing IP network. For example, although the CCN may be seamlessly integrated into the existing IP network, it is inappropriate for high-speed processing in transmission equipment due to a variable size of the information identifier. Moreover, due to a large amount of information to be maintained in network equipment, there are scalability issues as an amount of identifiers present in the network increases.

As the related art, a paper discussing a CCN structure (V. Jacobson et al., Networking Named Content, CoNEXT 2009) is well known. In this paper, the CCN in which content and locations are decoupled was proposed. For this purpose, a universal component of an IP of a network stack was replaced by named content. However, since this paper did not specifically explain integration with the IP network and employed a variable length identifier, it is difficult to accommodate in the network equipment and scalability issues occur.

SUMMARY

The following description relates to technology that can implement an information-centric network seamlessly interworking with an existing IP network and easily support core functions of ICN, for example, on-path caching.

Further, the following description relates to technology that can achieve higher scalability than other information-centric networking methods.

In one general aspect, a packet processing device for an IP-based information-centric network includes a packet transceiver configured to transmit and receive packets, and a packet processing unit configured to process a transmitted or received packet including a forwarding identifier that identifies information present in the ICN and corresponds to an IP address of a network node holding the information, and at least one sub-identifier that identifies child information of the information, in which the forwarding identifier is used to forward packets.

The packet processing device may further include an information register configured to register the forwarding identifier of holding information, in which the packet processing unit requests the forwarding identifier included in the registry registration request packet to be registered in the information register and forwards the registry registration request packet to a registry server through the packet transceiver when a registry registration request packet including the forwarding identifier and a corresponding IP address is received from an application layer through the packet transceiver.

The packet processing device may further include an information cache unit configured to cache an information response packet, in which the packet processing unit identifies whether the information response packet including the forwarding identifier and the sub-identifier included in the received information request packet is cached in the information cache unit, and when it is identified as the information response packet is cached, forwards a corresponding information response packet to a network node that requested information.

The packet processing unit may forward the information request packet to the application layer through the packet transceiver, and accordingly, forward the information response packet responded from the application layer to the network node that requested information when a corresponding information response packet is not present in the information cache unit but the forwarding identifier included in the information request packet is registered in the information register.

The packet processing unit may relay the information request packet to be forwarded to a destination node when the forwarding identifier included in the information request packet is not registered in the information register.

The packet processing unit may relay the information request packet to be forwarded to the IP address when an IP address of the destination node is set in the information request packet as a forwarding hint.

When a cacheable payload is included in the information response packet received through the packet transceiver, the packet processing unit may forward the payload to the information cache unit.

The packet processing unit may forward the received information response packet to the application layer when the forwarding identifier of the information response packet received through the packet transceiver is registered in the information register.

The packet processing unit may relay the received information response packet to be forwarded to the destination node when the forwarding identifier of the received information response packet is not registered in the information register.

The packet processing unit may relay the information response packet to be forwarded to the IP address when an IP address of the destination node is set in the received information response packet as the forwarding hint.

Other features and aspects will be apparent from the following detailed description, the drawings, and the claims.

Figure 1:
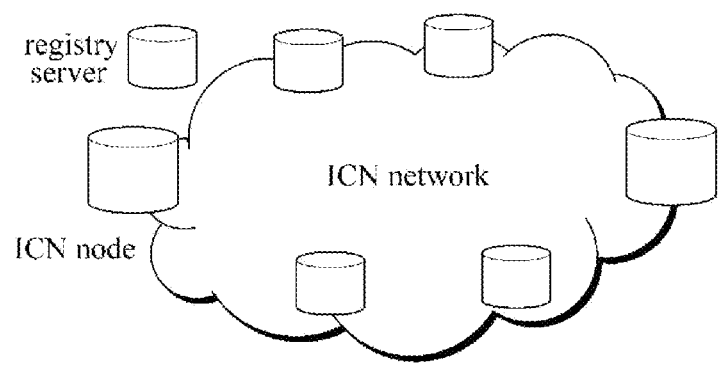
FIG. 1 is a diagram illustrating a structure of an information-centric network according to an embodiment of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The above and other aspects of the invention will be more apparent by the following exemplary embodiments described with reference to the accompanying drawings. Hereinafter, the embodiments will be described in detail in order to facilitate understanding and reproducing by those skilled in the art.

In the invention, provided is technology that utilizes an existing IP network infrastructure as is and implements information-centric networking. In brief, the invention is implemented by hop-by-hop IP-based packet forwarding and end-to-end ID-based packet forwarding. In order to achieve high scalability, an identifier registry (ID registry) is separated from transmission equipment and is provided in each network section, thereby reducing an amount of status information managed by the transmission equipment.

FIG. 1 is a diagram illustrating a structure of an information-centric network according to an embodiment of the invention.

The ICN network includes an ICN node and a registry server. The ICN node is network equipment that is responsible for transmitting packets and the registry server records which ICN node has content. The registry is also an ICN node but has an additional ability to manage a list of <forwarding identifier, IP address of ICN node>. Here, the forwarding identifier is an identifier uniquely given to information, that is, content, and this will be described below. As seen here, the forwarding identifier is managed in correspondence with the IP address of the ICN node holding corresponding information, that is, they are managed as a pair.

Figure 2:
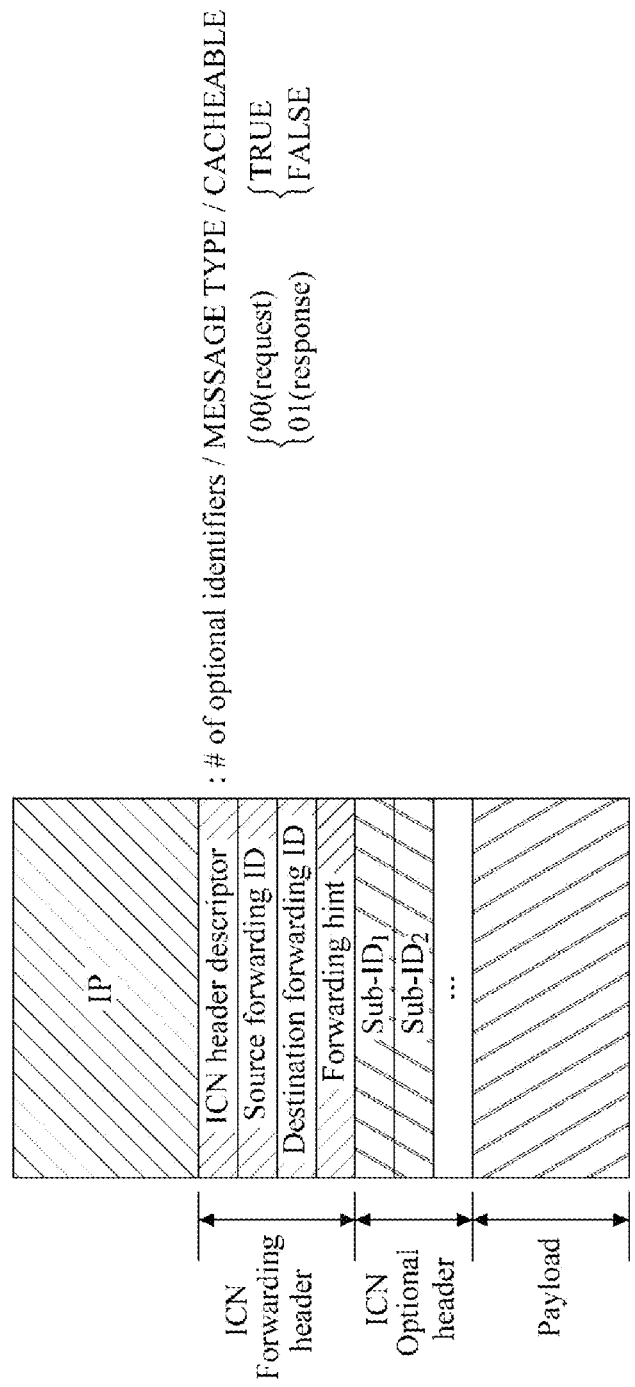
FIG. 2 is a diagram illustrating a structure of an ICN packet according to the embodiment of the invention.

FIG. 2 is a diagram illustrating a structure of an ICN packet according to the embodiment of the invention.

As illustrated in FIG. 2, the ICN packet includes an IP header used in an IP network, a packet forwarding header, and an optional header. The packet forwarding header includes a header descriptor, a source forwarding identifier, a destination forwarding identifier, and a forwarding hint. The header descriptor includes, for example, information about a size of the optional header, a code value indicating a type of the packet, and a code value indicating a cacheable packet. In the embodiment, there are two types of the packets, an information request packet and an information response packet. The forwarding hint is for reducing overhead occurring when the ICN node transforms the forwarding identifier of an information provider side into the IP address each time the packet is processed. This field value may be 0 or an IP address.

The optional header lists sub-identifiers dependent on the destination forwarding identifier. Therefore, an information providing subject, who received the information request packet, needs to find which information is requested using both the destination forwarding identifier and the sub-identifier. However, the ICN nodes, which transmit packets, only use the destination forwarding identifier included in the packet forwarding header to transmit packets. An information identifier is divided into the forwarding identifier and the sub-identifiers so as to establish hierarchy among identifiers. That is, a hierarchical identifier includes the forwarding identifier and the sub-identifier. The forwarding identifier is a unique identifier in the network. A first sub-identifier identifies child information of information identified by the forwarding identifier. The first sub-identifier is a unique identifier in information identified by its parent forwarding identifier. A second sub-identifier identifies child information of information identified by the first sub-identifier and is a unique identifier in information identified by the first sub-identifier. Third and fourth sub-identifiers identify information in the same method. There is no limitation on a number of sub-identifiers.

Figure 3:
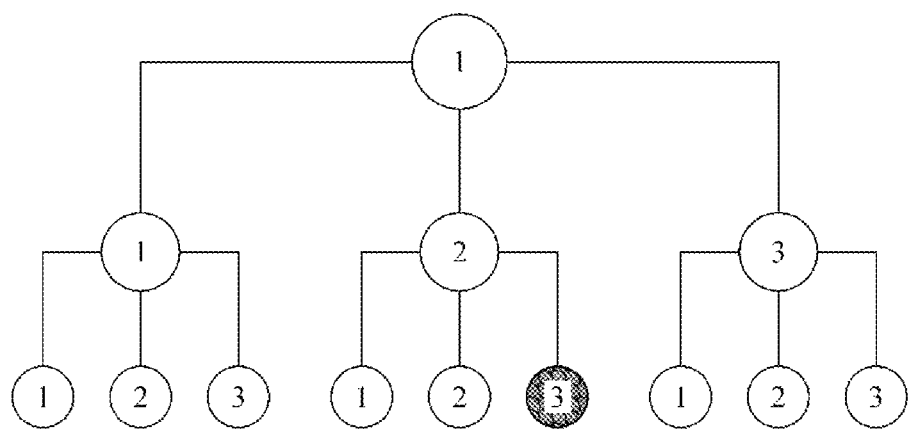
FIG. 3 is an exemplary diagram in which hierarchical identifiers are given to hierarchical information according to the invention.

FIG. 3 is an exemplary diagram in which hierarchical identifiers are given to hierarchical information according to the invention.

Illustrated hierarchical information has three pieces of sub-information. Each piece of sub-information includes three pieces of sub-sub-information. The top forwarding identifier 1 is an identifier to identify overall information. Since the identifier is unique in the network, it may be used to identify overall hierarchical information in FIG. 3. A specific part of the hierarchical information may be identified using the forwarding identifier, the first sub-identifier, and the second sub-identifier. For example, information separately displayed in FIG. 3 may be identified using hierarchical identifiers [1, 2, 3]. In the hierarchical identifier, 1 indicates the forwarding identifier, 2 indicates the first sub-identifier, and 3 indicates the second sub-identifier. Unlike a method of the CCN in which both the forwarding identifier and its sub-identifier are encoded in a single identifier, since the identifier to forward packets and the sub-identifier to hierarchically identify sub-information in information indicated by corresponding identifiers are divided, routers in the network that forward packets may forward packets using only the forwarding header.

Figure 4:
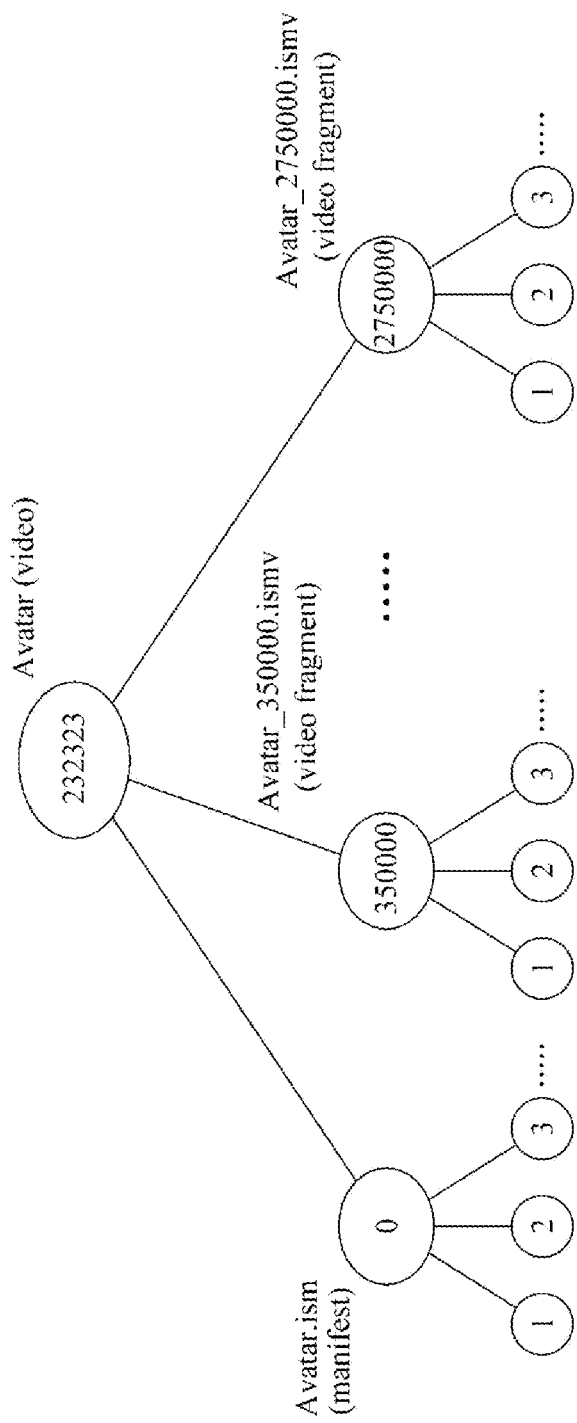
FIG. 4 is an exemplary diagram illustrating a type of hierarchical structure of an HTTP adaptive streaming video according to the invention.

FIG. 4 is an exemplary diagram illustrating a type of hierarchical structure of an HTTP adaptive streaming video according to the invention.

A method of giving an identifier to a video encoded for HTTP adaptive streaming using the above-mentioned hierarchical identifier structure is given below. For example, in order to provide the video, for example, Avatar, via the network, the forwarding identifier unique in the network needs to be given to this video. It is assumed that the forwarding identifier value given to the Avatar video is, for example, 232323. In general, the video encoded for the HTTP adaptive streaming includes one manifest file and a plurality of video fragments. Therefore, logically, the Avatar video may be organized as a structure in FIG. 4. In FIG. 4, values displayed in each circle are identifiers of corresponding information. That is, the Avatar video is identified by the forwarding identifier 232323. Among files configuring this video, a file Avatar.ism serving as the manifest file is identified by the first sub-identifier 0, a first video fragment supporting a bit rate of 350000 is identified by the first sub-identifier 350000, and a video fragment supporting a bit rate of 2750000 is identified by the first sub-identifier 2750000. Values of all displayed first sub-identifiers are unique in the video indicated by the forwarding identifier 232323. Moreover, the second sub-identifiers identify a block in the file indicated by the first sub-identifier. A size of the block may be arbitrarily determined, for example, 1024 bytes. In this case, [232323, 0, 1] refers to a block containing 0 to 1023 bytes in the manifest file. [232323, 0, 2] refers to a block containing 1024 to 2047 bytes in the file Avatar_350000.ismv of the Avatar video. Using the above-mentioned system, an application layer using the information-centric network may be provided with hierarchical information given below.

(1) An information consumer sets an ID of information to use in a forwarding identifier field.

(2) The information consumer sets sub-identifiers configuring the information to use in an optional header.

(3) The information consumer sets a number of the sub-identifiers in a header descriptor.

(4) The information consumer transmits packets to the information-centric network.

(5) The information consumer receives packets returned by the information-centric network.

(6) The information consumer obtains the information to use by observing a payload of the received packet.

By repeating those procedures, the information consumer may obtain necessary information by requesting information from the information-centric network. The structure of the packet described above is just an example, and any type of packet structure may be possible as long as all information above described is included.

Figure 5:
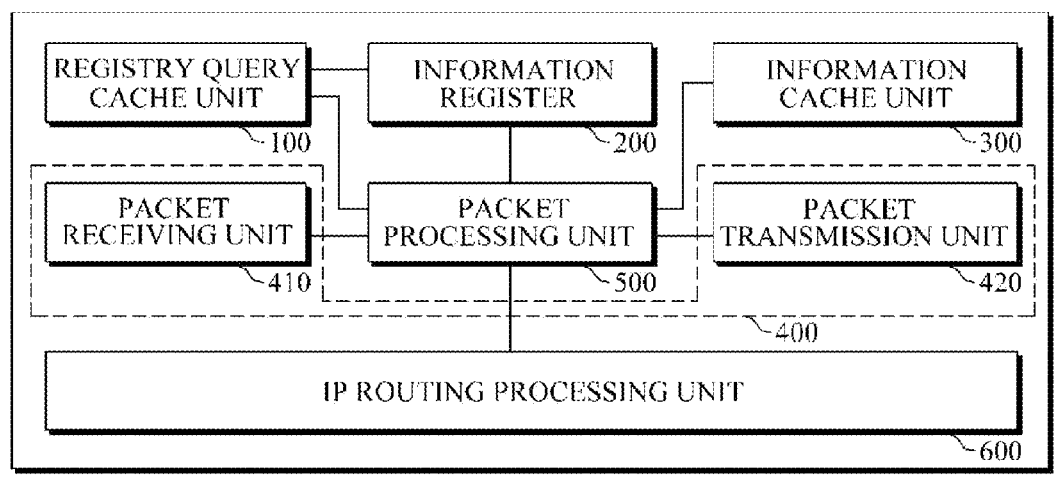
FIG. 5 is a block diagram illustrating an ICN node configuring the information-centric network according to the embodiment of the invention.

FIG. 5 is a block diagram illustrating the ICN node configuring the information-centric network according to the embodiment of the invention.

The ICN node, which is a packet processing device, processes a packet configured as in FIG. 2. For this purpose, the ICN node includes a registry query cache unit 100, an information register 200, an information cache unit 300, a packet transceiver 400, and a packet processing unit 500. The registry query cache unit 100 is a unit in which a query result with respect to the registry is cached. The query result with respect to the registry is an ordered pair of <forwarding identifier, IP address>. At this time, at least one address may be returned as the query result and this result is stored in the registry query cache unit 100. The registry query cache unit 100 includes an item of <forwarding identifier of registry, IP address of registry>, which is always cached and an irreplaceable item. When registry duplication is required, at least one IP address may be registered in the registry query cache unit 100, and this item is immediately added when the ICN node is executed. When the packet processing unit 500 queries by passing the forwarding identifier, the registry query cache unit 100 returns a list of corresponding IP addresses when corresponding IP addresses are stored, or otherwise, returns 0.

The information register 200 manages all forwarding identifier lists present in the corresponding ICN node. When the packet processing unit 500 queries by passing the forwarding identifier, the information register 200 returns true when the identifier is in the list, and otherwise returns false. The information cache unit 300 caches a general information response packet. The packet transceiver 400 includes a packet receiving unit 410 and a packet transmission unit 420. The packet receiving unit 410 may receive a packet formed in the application layer and a packet delivered from another ICN node. The received packet is immediately delivered to the packet processing unit 500. The packet transmission unit 420 transmits packets to another ICN node and transmits packets to the application layer. The packet processing unit 500 processes each of the information request packet and the information response packet as follows.

1. Information request packet
  (1) Registry registration request packet received from the application layer
    ① An identifier included in this request packet is requested to be registered in the information register 200.
  (2) Response packet with respect to the corresponding request packet is present in the information cache unit 300
    ① The packet transmission unit 420 is requested to transmit the information response packet present in the information cache unit 300 to a received interface. Before transmission, sender and receiver IPs in an IP header of the response packet are changed to an IP address of the ICN node and a sender IP address of the information request packet.
  (3) Response packet with respect to the corresponding request packet is not present in the information cache unit
    ① A destination forwarding identifier (including sub-identifiers) included in the corresponding request packet is registered in the information register 200
      (a) The packet transmission unit 420 is requested to deliver the request packet to the application layer.
    ② Otherwise
      (a) Forwarding hint is set and its value matches an address of the ICN node
        ⓐ The corresponding packet is discarded since the information request packet is received in the destination ICN node but requested information is not present in the destination ICN node
      (b) Forwarding hint is set and its value is different from the ICN node address
        ⓐ After an address h of a next-hop ICN node is identified by requesting the address from the IP routing processing unit 600, a sender IP address recorded in an IP header field of the packet is changed to an IP address of the ICN node, a receiver IP address recorded in the IP header field of the packet is changed to h, and the packet is delivered to the packet transmission unit 420 to be relayed to the next-hop ICN node.
      (c) Forwarding hint is not set
        ⓐ It is observed that the response packet with respect to the registry query packet including the destination forwarding identifier is cached in the registry query cache unit 100. When the response packet is not cached, the received packet is stored in an internal temporary storage, and then a registry query packet including the destination forwarding identifier of the received packet is created, and the corresponding packet is delivered to the packet transmission unit 420 to be sent to the registry. When the cached response packet is present, an IP address recorded in the corresponding response packet is recorded in the forwarding hint, and then the process proceeds to 1.(3).② above described.

2. Information response packet
(1) Payload is included in corresponding response packet
  ① A case of a cacheable payload (a case of a general information response packet)
    (a) It is delivered to the information cache unit 300 to be cached
  (2) The destination forwarding identifier of the corresponding response packet has been registered in the information register 200
  ① Corresponding response packet is the registry query response packet
    (a) The registry query cache unit 100 is requested to cache the corresponding response packet.
    (b) An address value x included in the registry query response packet is extracted.
    (c) Among packets stored in the internal temporary storage, the forwarding hint values of all the packets which are in standby for the corresponding response packet are set as x.
    (d) The IP routing processing unit 600 is requested to identify the address h of the next-hop ICN node with respect to x, a sender IP address recorded in the IP header field of the packet is changed to an IP address of the ICN node, a receiver IP address is changed to h, and delivers the addresses to the packet transmission unit 420 to relay the packet to the next-hop ICN node.
  ② Corresponding response packet is the registry registration response packet
    (a) The payload includes OK
    ③ The corresponding packet is delivered to the application layer and success of registration is notified of
    (b) The payload includes ERROR
    ⓐ The corresponding packet is delivered to the information register 200 and an identifier recorded in the information register 200 is deleted
    ⓑ The corresponding packet is delivered to the application layer and failure of registration is notified of.
  ③ Corresponding response packet is a general information response packet
    (a) Corresponding response packet is delivered to the application layer
(3) Destination forwarding identifier of corresponding response packet is not registered in the information register 200.
  ① Forwarding hint is set and its value matches an address of the ICN node
    (a) The received packet is discarded since the packet is delivered to the wrong destination.
  ② Forwarding hint is set and its value is different from the address of the ICN node
    (a) After the address h of the next-hop ICN node is identified by requesting to the IP routing processing unit 600, a sender IP address recorded in the IP header field of the packet is changed to an IP address of the ICN node, a receiver IP address recorded in the IP header field of the packet is changed to the IP address of the ICN node, a receiver IP address recorded in the IP header field of the packet is changed to h, and the packet is delivered to the packet transmission unit 420 to be relayed to the next-hop ICN node.
  ③ Forwarding hint is not set
    (a) It is observed that the response packet with respect to the registry query packet including the destination forwarding identifier is cached in the registry query cache unit 100. When the response packet is not cached, the received packet is stored in the internal temporary storage, and then a registry query packet including the destination forwarding identifier of the received packet is created, and the corresponding packet is delivered to the packet transmission unit 420 to send to the registry. When the cached response packet is present, an IP address recorded in the corresponding response packet is recorded in the forwarding hint, and then the process proceeds to 2.(3) again.

Figure 6:
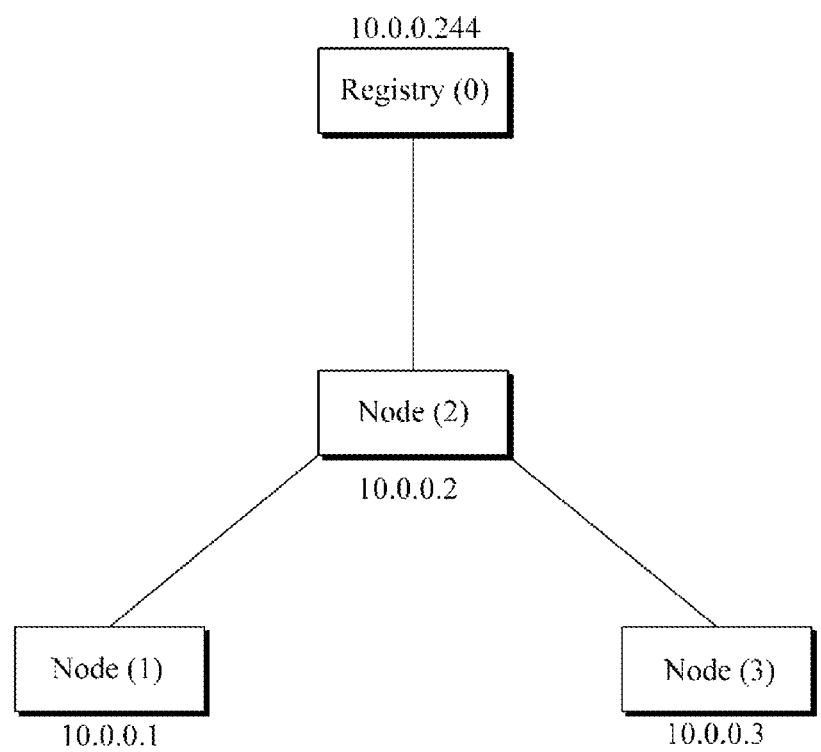
FIG. 6 is a diagram illustrating a configuration of the ICN network according to the embodiment of the invention.
Figure 7:
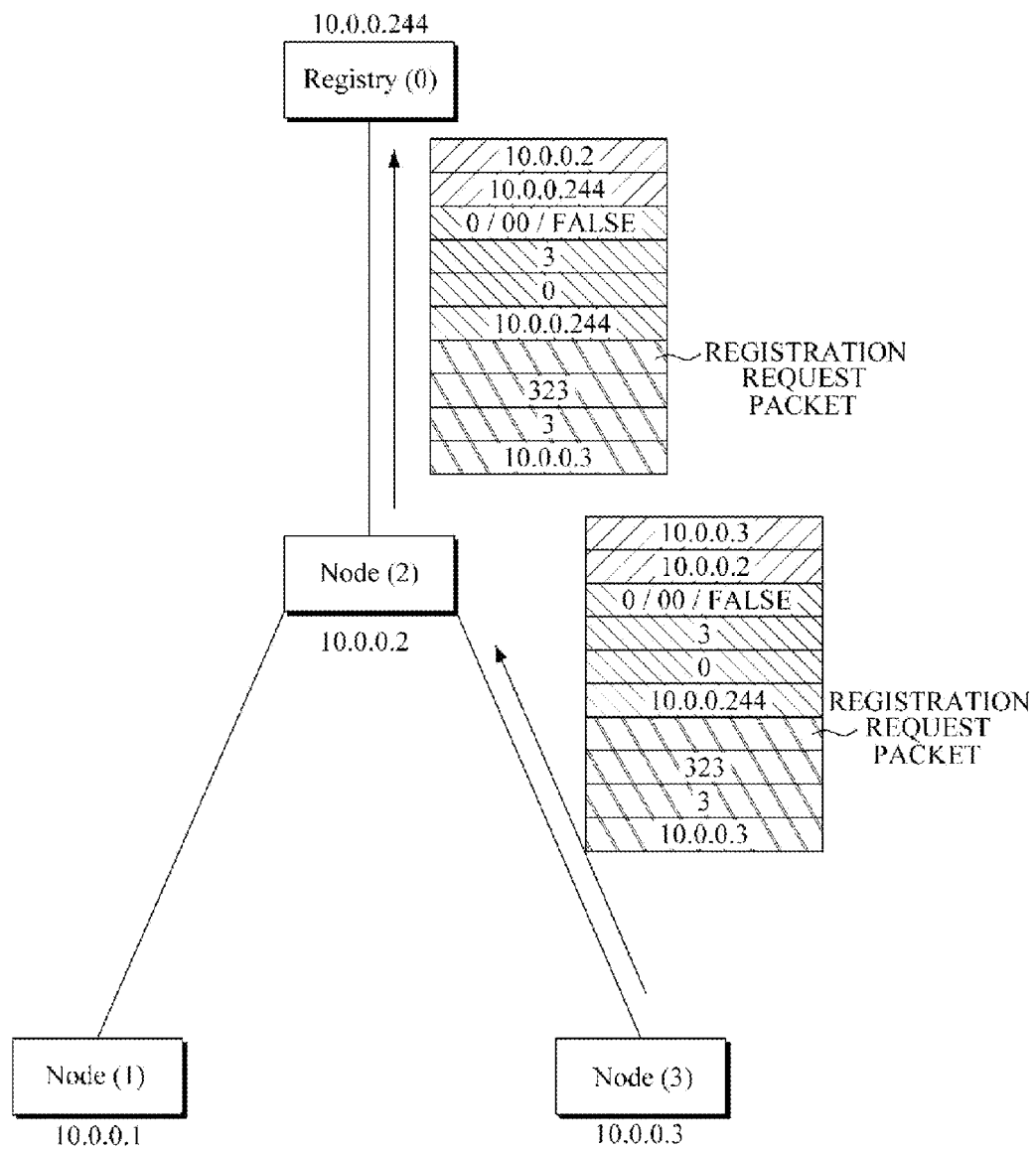
FIG. 7 is an exemplary diagram for describing a transmission process of a registry registration request packet.
Figure 8:
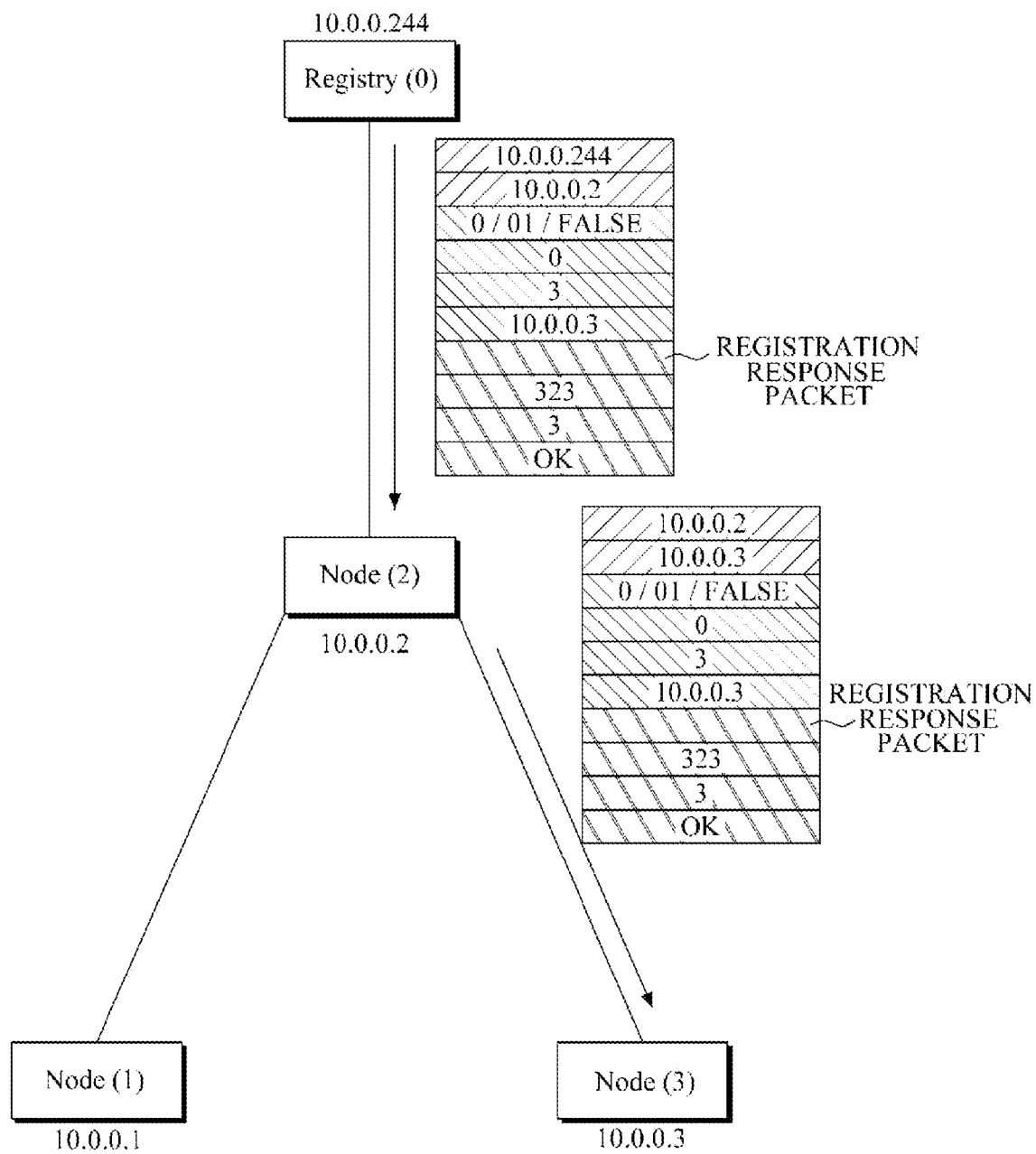
FIG. 8 is an exemplary diagram for describing a transmission process of a registry registration response packet.
Figure 9:
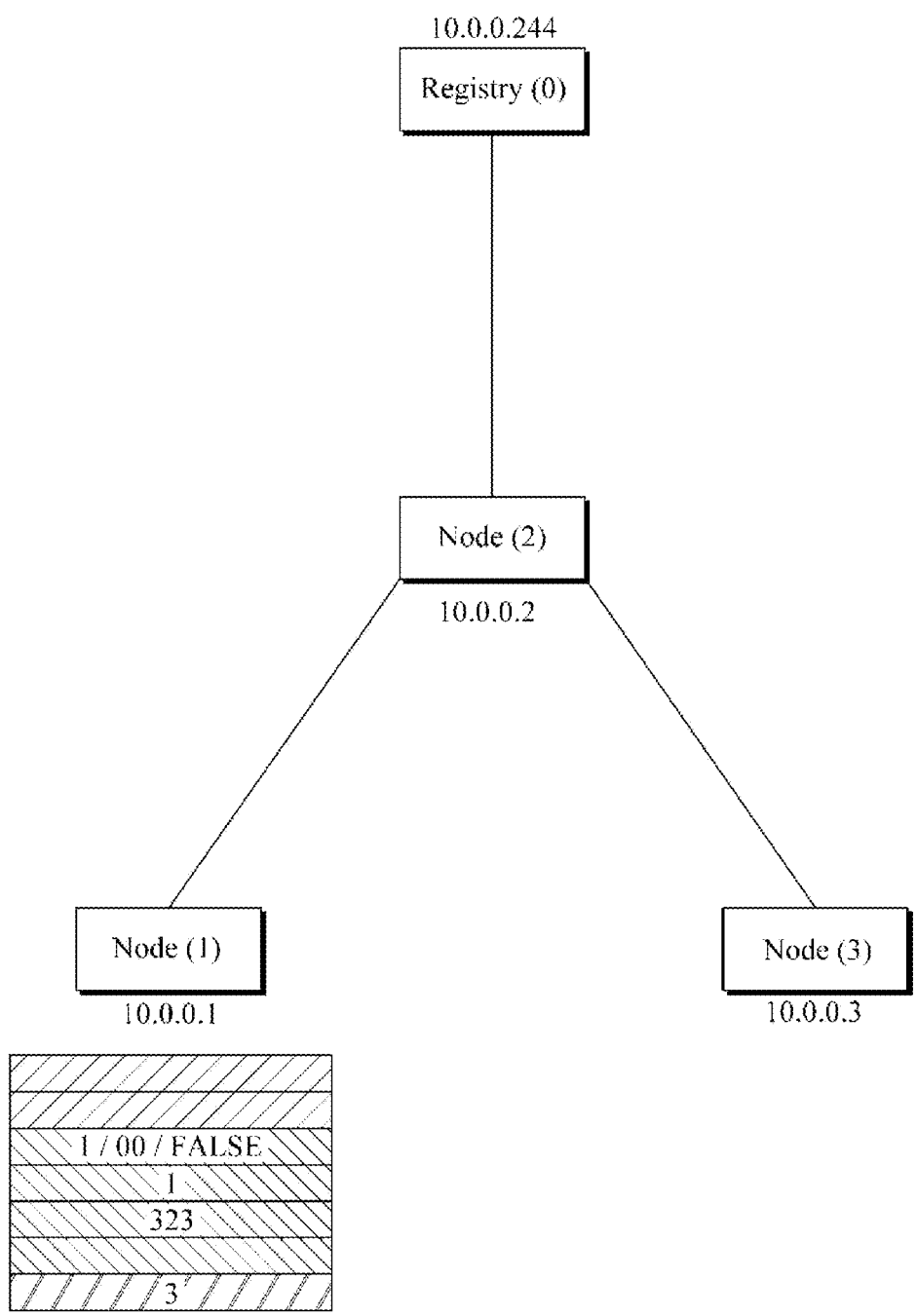
FIG. 9 is an exemplary diagram for describing a preparing process of an information request packet.
Figure 10:
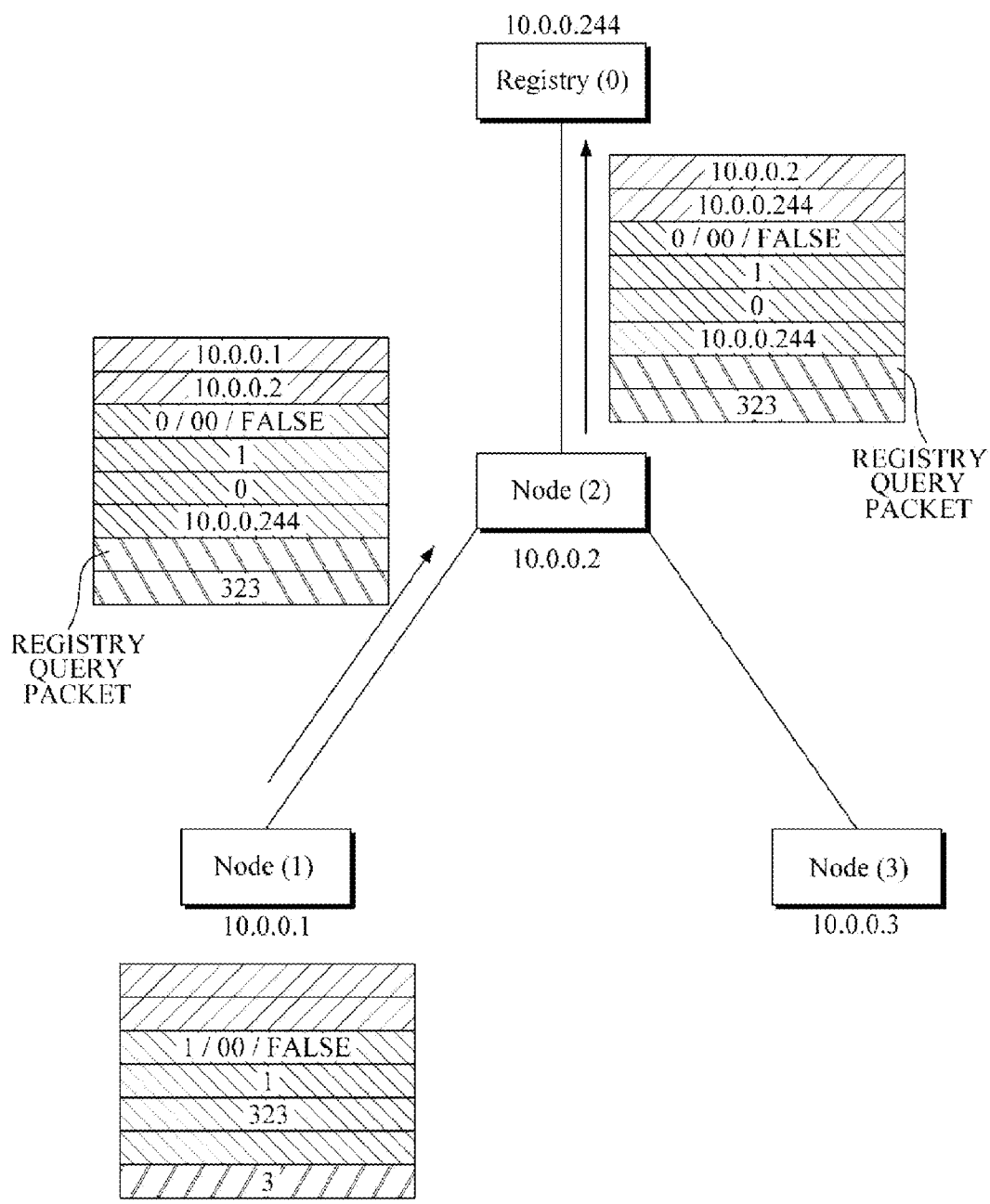
FIG. 10 is an exemplary diagram for describing a transmission process of a registry query packet.
Figure 11:
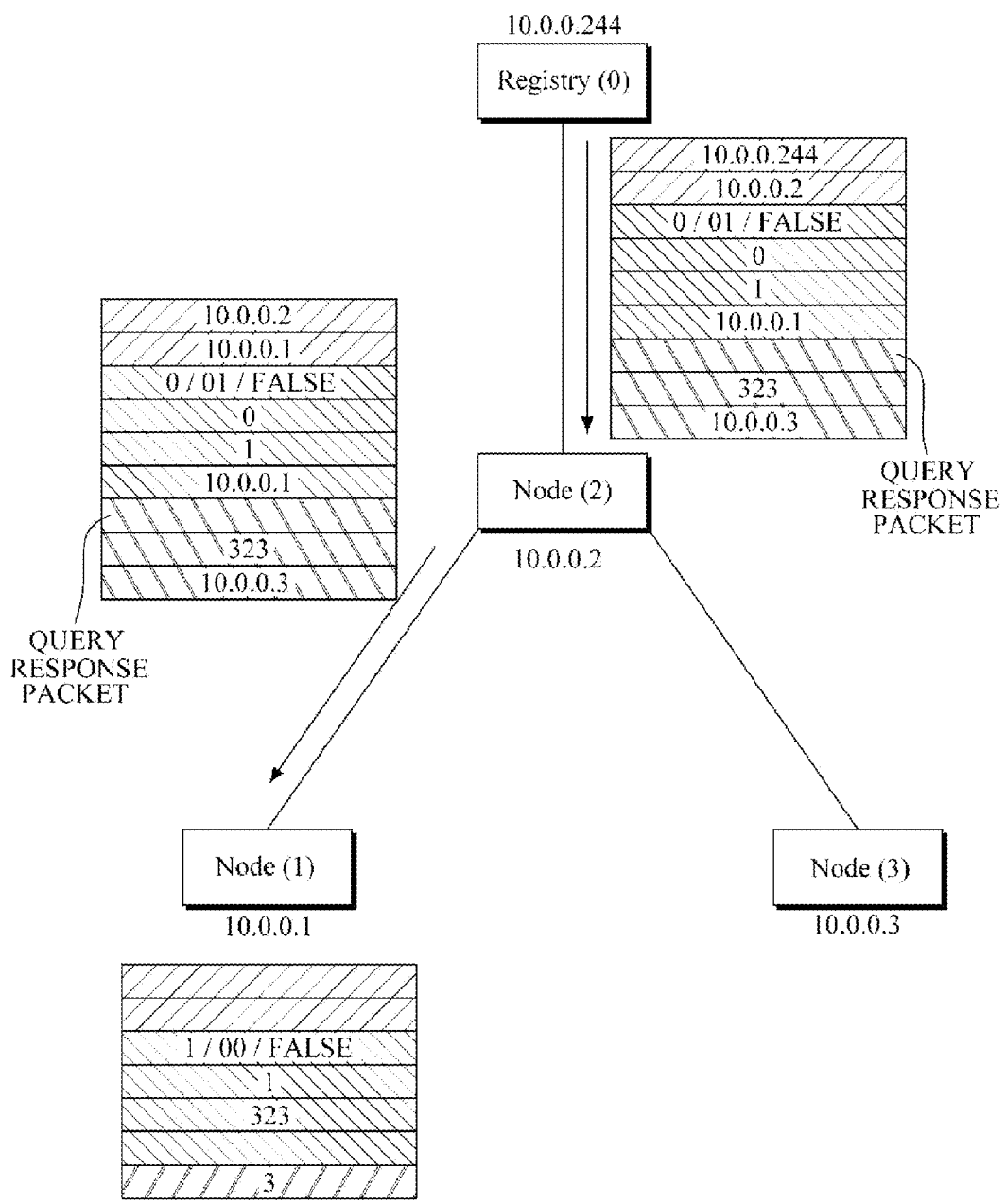
FIG. 11 is an exemplary diagram for describing a transmission process of a registry query response packet.
Figure 12:
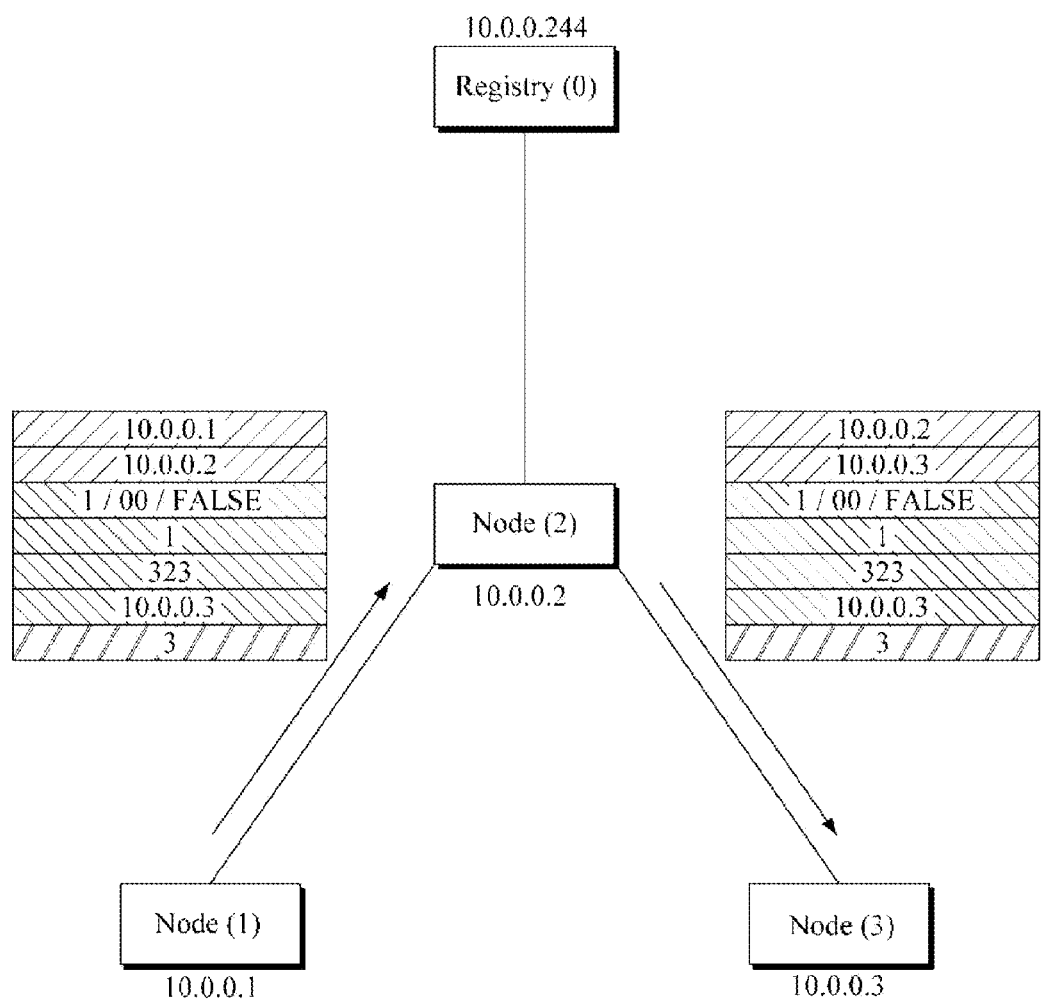
FIG. 12 is an exemplary diagram for describing a transmission process of the information request packet.
Figure 13:
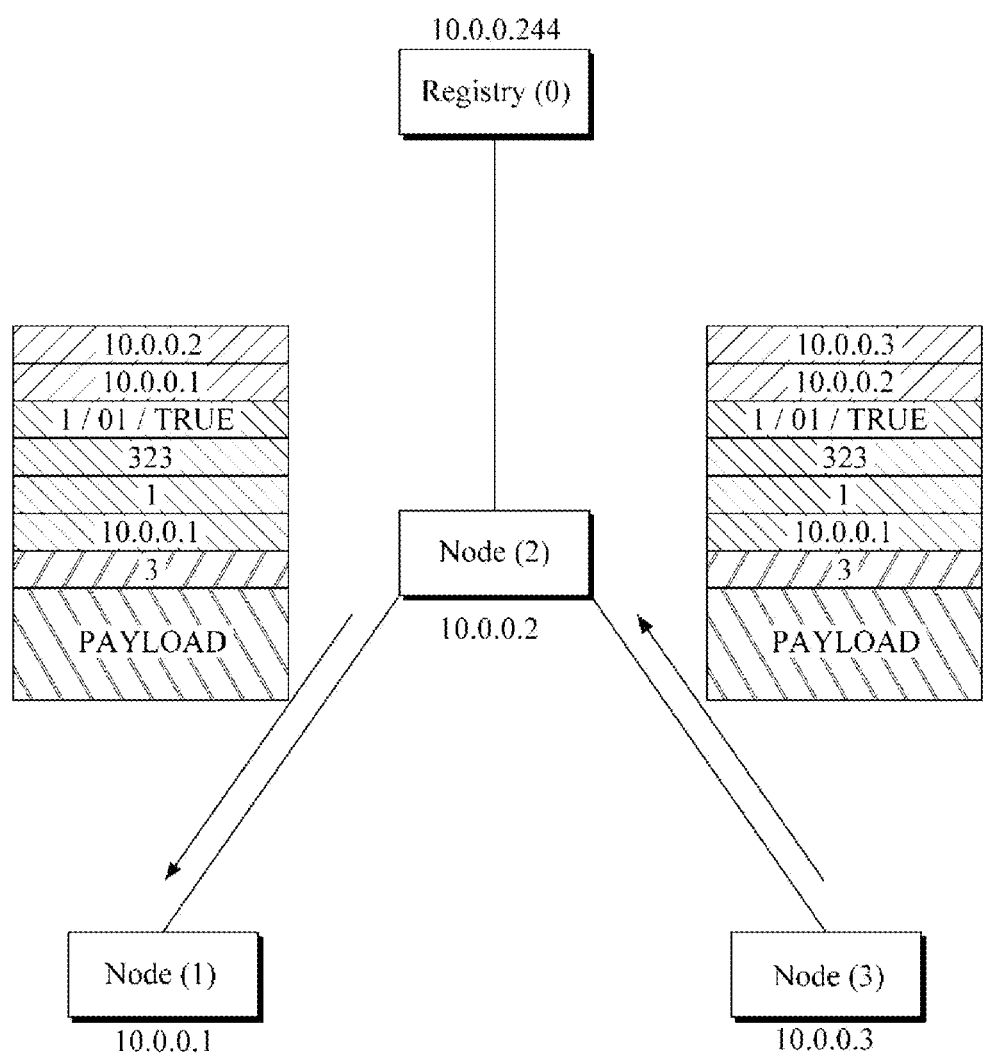
FIG. 13 is an exemplary diagram for describing a transmission process of the information response packet.

FIG. 6 is a diagram illustrating a configuration of the ICN network according to the embodiment of the invention. FIG. 7 is an exemplary diagram for describing a transmission process of the registry registration request packet. FIG. 8 is an exemplary diagram for describing a transmission process of the registry registration response packet. FIG. 9 is an exemplary diagram for describing a preparing process of the information request packet. FIG. 10 is an exemplary diagram for describing a transmission process of the registry query packet. FIG. 11 is an exemplary diagram for describing a transmission process of the registry query response packet. FIG. 12 is an exemplary diagram for describing a transmission process of the information request packet. FIG. 13 is an exemplary diagram for describing a transmission process of the information response packet.

The embodiment of an information transmission process will be described. For illustrative purposes, a network topology in FIG. 6 is assumed. In the example illustrated in FIG. 6, the ICN network includes one registry server and three general ICN nodes. The registry server has an IP address 10.0.0.244, and each of nodes 1, 2, and 3 has identifier 10.0.0.1, 10.0.0.2, and 10.0.0.3. All ICN nodes transmit an identifier and location of information managed by themselves included in the registry registration request packet to the registry server. At this time, the packet processing unit 500 sets the next-hop IP address, which is calculated in the IP routing processing unit 600 by offering the registry IP address, as a receiver IP address of the IP header, and sets the IP address of the ICN node as a sender IP address. For reference, since the registry IP address has already been stored in the registry query cache unit 100, it is used for the process.

As illustrated in FIG. 7, for example, the node 3 transmits information indicating the registration request packet, a list of all identifiers including its ID, and its address to the registry server included in the payload of the registry registration request packet. In order to transmit the packet received from the node 3 to the destination 10.0.0.244 (forwarding hint value), the node 2 determines the IP address (10.0.0.244) of the next-hop ICN node by querying the IP routing processing unit 600, and accordingly, appropriately changes a sender or receiver address value of the IP header. As a result of the registry registration request transmission, the registry server creates a registry registration response packet and transmits the packet as illustrated in FIG. 8. As illustrated in FIG. 8, a response indicating that the forwarding identifiers 323 and 3 be successfully registered in the registry server is in transmission included in the packet payload. Similarly to FIG. 7, in FIG. 8, the registry server calculates the address 10.0.0.2 of the next-hop ICN node by querying the address value 10.0.0.3 corresponding to the destination forwarding identifier 3 to the IP routing processing unit 600, and accordingly, appropriately changes a sender or receiver IP field value of the IP header. The forwarding hint value is set to 10.0.0.3. In order to transmit the packet to the destination 10.0.0.3 (forwarding hint value), the node 2, which relays packets, determines the IP address (10.0.0.3) of the next-hop ICN node by querying the IP routing processing unit 600, and accordingly, appropriately changes a sender or receiver address value of the IP header. All nodes similarly perform the above-described procedures.

Here, it is assumed that the node 1 wishes to use information indicated by the forwarding identifier 323 in the node 3. The node 1 prepares the packet as illustrated in FIG. 9. Values of the IP header and the forwarding hint of the packet exemplified in FIG. 9 are empty. In order to set the empty values, the node 1 firstly queries the registry server on the location of the node to manage the forwarding identifier 323. For queries, as exemplified in FIG. 10, the node 1 creates a registry query packet to transmit. Since a registry IP address value to be used as a routing hint value of the registry query packet has already been stored in the registry query cache unit 100, it is used for this process. The node 1 determines an IP address of the next-hop ICN node by querying the IP routing processing unit 600 the corresponding address, and appropriately changes a sender or receiver IP address field of the IP header using the determined address. The node 2 also performs the same task on the packet delivered from the node 1 and relays the packet to the registry server, which is a destination node.

Therefore, as exemplified in FIG. 11, the registry server creates a query response packet to transmit. The query response packet is relayed by the node 2 and delivered to the node 1. The node 1 receiving the query response packet records the fact that the forwarding identifier 323 is managed by 10.0.0.3 in the registry query cache unit 100. The forwarding hint of the packet, which is in transmission standby, is set to 10.0.0.3. An IP address of the next-hop ICN node is determined by passing 10.0.0.3 to the IP routing processing unit 600. In FIG. 11, the determined value of the IP address is 10.0.0.2, and so the node 1 sets a receiver IP address value of the IP header to 10.0.0.2, and sets a sender IP address value to the IP address value of the node 1. After the setting is completed, as exemplified in FIG. 12, the node 1 transmits the information request packet. The transmitted information request packet is relayed by the node 2 and delivered to the node 3. The node 3, that has received the information request packet, delivers the packet to the application layer, and the application layer creates an information response packet with respect to the information request packet to transmit. The transmission process is similar to the example in FIG. 13.

Meanwhile, in the transmission process, since the received information response packet has the payload, the nodes 2 and 1 cache the packet. The cached information response packet is used to send a response when there is a same information request later, that is, it is used to send a response when there is a request for information on the same forwarding identifier and sub-identifier. Therefore, when the node 2 receives a request for the same information, the corresponding request packet is not delivered to another node and the cached request packet is directly transmitted to the interface that has received the request packet. In transmission, sender and receiver IP addresses of the IP header are set to match receiver and sender IP addresses recorded in the IP header of the request packet, respectively.

According to the invention, it is possible to implement the information-centric networking without modifying an IP transport layer.

Moreover, according to the invention, it is possible to implement the information-centric network seamlessly interworking with the existing IP network and easily support core functions of ICN, for example, on-path caching.

While the present invention has been described with reference to the exemplary embodiments, it is understood to those skilled in the art that the invention may be embodied in modified forms without departing from the spirit of the invention. Therefore, the disclosed embodiments should be considered in a descriptive sense only and not for purposes of limitation. The scope of the invention is defined not by the detailed description of the invention but by the appended claims, and all differences within the scope will be construed as being included in the present invention.

The present invention can be implemented as computer-readable code in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A packet processing device for an IP-based information-centric network (ICN), the device comprising:
    a packet transceiver configured to transmit and receive packets;
    a packet processing unit configured to process a transmitted or received packet including a forwarding identifier that identifies information present in the ICN and corresponds to an IP address of a network node holding the information, and at least one sub-identifier that identifies child information of the information; and
    an information register configured to register a plurality of forwarding identifiers,
    wherein the packet processing unit requests the forwarding identifier included in a registry registration request packet to be registered in the information register and forwards the registry registration request packet to a registry server through the packet transceiver when the registry registration request packet including the forwarding identifier and a corresponding IP address is received from an application layer through the packet transceiver, and
    wherein the forwarding identifier is used to forward packets.

2. The device according to claim 1, further comprising an information cache unit configured to cache a first information response packet, wherein the packet processing unit identifies whether the first information response packet including the forwarding identifier and the sub-identifier included in a received information request packet is cached in the information cache unit, and when it is identified that the first information response packet is cached in the information cache unit, forwards a corresponding second information response packet to a network node that requested information.

3. A packet processing device for an IP-based information-centric network (ICN), the device comprising:
a packet transceiver configured to transmit and receive packets;
a packet processing unit configured to process a transmitted or received packet including a forwarding identifier that identifies information present in the ICN and corresponds to an IP address of a network node holding the information, and at least one sub-identifier that identifies child information of the information;
an information register configured to register a plurality of forwarding identifiers, wherein the packet processing unit requests the forwarding identifier included in a registry registration request packet to be registered in the information register and forwards the registry registration request packet to a registry server through the packet transceiver when the registry registration request packet including the forwarding identifier and a corresponding IP address is received from an application layer through the packet transceiver; and
an information cache unit configured to cache a first information response packet, wherein the packet processing unit identifies whether the first information response packet including the forwarding identifier and the sub-identifier included in a received information request packet is cached in the information cache unit, and when it is identified that the first information response packet is cached in the information cache unit, forwards a corresponding second information response packet to a network node that requested information,
wherein the forwarding identifier is used to forward packets, and
wherein the packet processing unit forwards the information request packet to the application layer through the packet transceiver, and accordingly, forwards a third information response packet responded from the application layer to the network node that requested information when it is identified that the first information response packet is not cached in the information cache unit and the forwarding identifier included in the information request packet is registered in the information register.

4. The device according to claim 3, wherein the packet processing unit relays the information request packet to be forwarded to a destination node when the forwarding identifier included in the information request packet is not registered in the information register.

5. The device according to claim 4, wherein the packet processing unit relays the information request packet to be forwarded to an IP address when the IP address of the destination node is set in the information request packet as a forwarding hint.

6. The device according to claim 5, further comprising a registry query cache unit configured to cache a pair of a query result forwarding identifier included in a registry query response packet and a query result IP address included in the registry query response packet, wherein the packet processing unit sets the query result IP address cached in the registry query cache unit as the forwarding hint of the information request packet when the forwarding hint is not set and the query result forwarding identifier cached in the registry query cache unit corresponds to the forwarding identifier of the information request packet.

7. The device according to claim 6, wherein, when the query result forwarding identifier corresponding to the forwarding identifier of the information request packet is not cached in the registry query cache unit, the packet processing unit creates a registry query packet including the forwarding identifier of the information request packet, delivers the packet to the registry forwarding server through the packet transceiver, receives the registry query response packet through the packet transceiver, and sets the query result IP address included in the registry query response packet as the forwarding hint of the information request packet.

8. The device according to claim 5, wherein the packet processing unit discards the information request packet when the forwarding hint is set, the forwarding hint in the received information response packet matches a node IP address of the packet processing device, and a destination forwarding identifier of the information request packet is not registered in the information register.

9. The device according to claim 7, wherein, when a cacheable payload is included in the information response packet received through the packet transceiver, the packet processing unit forwards the payload to the information cache unit.

10. The device according to claim 5, wherein the packet processing unit forwards the received information response packet to the application layer when the forwarding identifier of the information response packet received through the packet transceiver is registered in the information register.

11. The device according to claim 10, wherein the packet processing unit relays the received information response packet to be forwarded to the destination node when the forwarding identifier of the received information response packet is not registered in the information register.

12. The device according to claim 11, wherein the packet processing unit relays the information request packet to be forwarded to the IP address when the IP address of the destination node is set in the information request packet as the forwarding hint.

13. The device according to claim 12, further comprising a registry query cache unit configured to cache a pair of a query result forwarding identifier included in the registry query response packet and a query result IP address included in the registry query response packet, wherein the packet processing unit sets the query result IP address cached in the registry query cache unit as the forwarding hint of the information response packet when the forwarding hint is not set in the received information response packet and the query result forwarding identifier cached in the registry query cache unit corresponds to the forwarding identifier of the information request packet.

14. The device according to claim 13, wherein, when the query result forwarding identifier corresponding to the forwarding identifier of the information request packet is not cached in the registry query cache unit, the packet processing unit creates a registry query packet including the forwarding identifier of the information request packet, delivers the packet to the registry forwarding server through the packet transceiver, receives the registry query response packet through the packet transceiver, and sets the query result IP address included in the registry query response packet as the forwarding hint of the information request packet.

15. The device according to claim 12, wherein the packet processing unit discards the information request packet when the forwarding hint is set in the received information response packet, the forwarding hint in the received information response packet matches a node IP address of the packet processing device, and the destination forwarding identifier of the information request packet is not registered in the information register.

* * * * *